US009803143B2

(12) United States Patent
Minatoya

(10) Patent No.: US 9,803,143 B2
(45) Date of Patent: Oct. 31, 2017

(54) METHOD FOR REMOVING MERCURY IN HYDROCARBON OIL

(71) Applicant: JX Nippon Oil & Energy Corporation, Tokyo (JP)

(72) Inventor: Masamichi Minatoya, Tokyo (JP)

(73) Assignee: NX Nippon Oil & Energy Corporation, Tokyo (JP)

( * ) Notice: Subject to any disclaimer, the term of this patent is extended or adjusted under 35 U.S.C. 154(b) by 0 days.

(21) Appl. No.: 14/910,047

(22) PCT Filed: Jun. 26, 2014

(86) PCT No.: PCT/JP2014/067016
§ 371 (c)(1),
(2) Date: Feb. 4, 2016

(87) PCT Pub. No.: WO2015/019738
PCT Pub. Date: Feb. 12, 2015

(65) Prior Publication Data
US 2016/0177191 A1    Jun. 23, 2016

(30) Foreign Application Priority Data

Aug. 7, 2013   (JP) .................................. 2013-163731

(51) Int. Cl.
*B01J 20/10*        (2006.01)
*B01J 20/20*        (2006.01)
(Continued)

(52) U.S. Cl.
CPC ........ *C10G 25/003* (2013.01); *B01J 20/0285* (2013.01); *B01J 20/10* (2013.01); *B01J 20/20* (2013.01); *C10G 2300/205* (2013.01)

(58) Field of Classification Search
CPC ...... C10G 25/00; C10G 25/003; C10G 25/02; C10G 25/06; C10G 25/08; C10G 25/09;
(Continued)

(56) References Cited

U.S. PATENT DOCUMENTS 4,094,777 A * 6/1978 Sugier .................... B01D 15/00
                                                           210/670
4,474,896 A   10/1984 Chao
(Continued)

FOREIGN PATENT DOCUMENTS

CA      1334193 C      1/1995
GB      2030592 A      4/1980
(Continued)

OTHER PUBLICATIONS

International Search Report dated Sep. 30, 2014 in International Application No. PCT/JP2014/067016.
(Continued)

*Primary Examiner* — Brian McCaig
(74) *Attorney, Agent, or Firm* — Panitch Schwarze Belisario & Nadel LLP

(57) ABSTRACT

The present invention provides a method which can efficiently adsorb and remove ionic mercury and/or organic mercury contained in a hydrocarbon oil for a long period of time. The method involves bringing the hydrocarbon oil into contact with an adsorbent containing a layered silicate mineral having an interlayer charge of 0 or an interlayer charge of greater than 0 to 0.6 or less.

8 Claims, 1 Drawing Sheet

1:1 layer structure
(1 tetrahedron to 1 octahedron)

2:1 layer structure
(2 tetrahedrons to 1 octahedron)

(51) Int. Cl.
*C10G 25/00* (2006.01)
*B01J 20/02* (2006.01)

(58) Field of Classification Search
CPC .. B01D 15/00; B01D 15/08; B01J 8/00; B01J 20/0285; B01J 20/10; B01J 20/20
See application file for complete search history.

(56) References Cited

U.S. PATENT DOCUMENTS

| | | | |
|---|---|---|---|
| 4,911,825 A | | 3/1990 | Roussel et al. |
| 5,053,209 A | * | 10/1991 | Yan .................. C07C 7/00 208/253 |
| 5,659,110 A | | 8/1997 | Herden et al. |
| 5,736,053 A | | 4/1998 | Ikushima et al. |
| 5,807,475 A | | 9/1998 | Kulprathipanja et al. |
| 6,719,828 B1 | | 4/2004 | Lovell et al. |
| 2007/0122327 A1 | * | 5/2007 | Yang .................. B01D 53/02 423/210 |
| 2008/0302733 A1 | * | 12/2008 | Wang .................. B01D 53/02 210/705 |
| 2011/0005975 A1 | * | 1/2011 | Rudolf .............. B01J 20/0237 208/253 |

FOREIGN PATENT DOCUMENTS

| | | |
|---|---|---|
| JP | S5276284 A | 6/1977 |
| JP | H01231920 A | 9/1989 |
| JP | H022873 A | 1/1990 |
| JP | H0940971 A | 2/1997 |
| JP | H10251667 A | 9/1998 |
| JP | 2000017273 A | 1/2000 |
| JP | 2013237794 A | 11/2013 |

OTHER PUBLICATIONS

Extended Search Report dated Feb. 21, 2017 in EP Application No. 14835338.6.

* cited by examiner

[Fig.1]
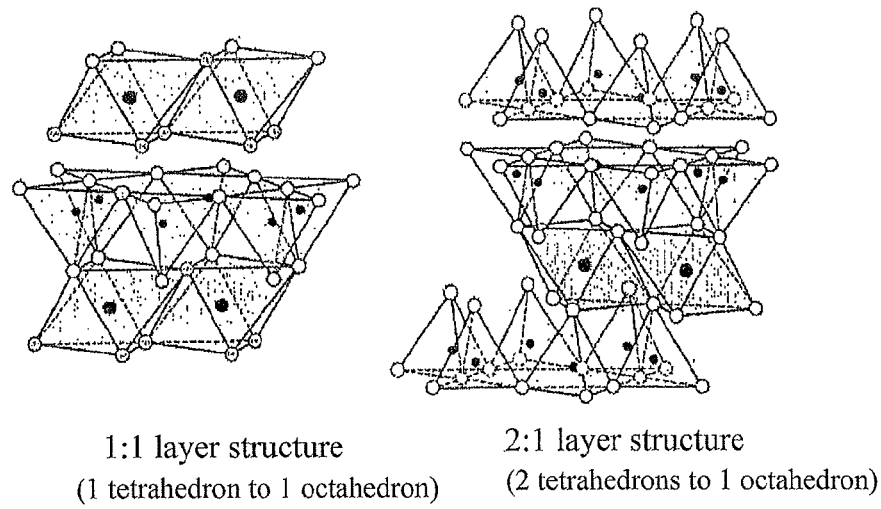
1:1 layer structure
(1 tetrahedron to 1 octahedron)
2:1 layer structure
(2 tetrahedrons to 1 octahedron)
[Fig.2]
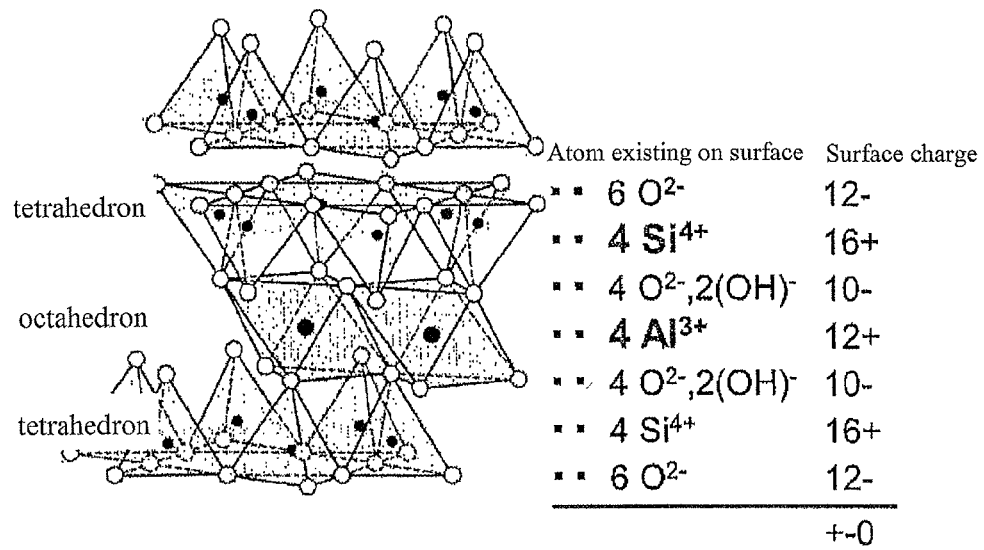

METHOD FOR REMOVING MERCURY IN HYDROCARBON OIL

CROSS-REFERENCE TO RELATED APPLICATION

This application is a Section 371 of International Application No. PCT/JP2014/067016, filed Jun. 26, 2014, which was published in the Japanese language on Feb. 12, 2015, under International Publication No. WO 2015/019738 A1, and the disclosure of which is incorporated herein by reference.

TECHNICAL FIELD

The present invention relates to removal of mercury in hydrocarbon oils and more specifically relates to a method for adsorbing and removing ionic mercury and/or organic mercury from a hydrocarbon oil containing the same.

BACKGROUND ART

It is known that natural gas condensates recovered from natural gas fields after eliminating liquefied petroleum gas and some crude oils contain mercury in amounts ranging from several tens to hundreds ppb by weight depending on their production districts. Mercury contained in such hydrocarbon oils is not in a single form but contained in the forms of elemental mercury, ionic mercury and organic mercury. When such liquid hydrocarbon oils are used as chemical feedstocks such as the feedstock of ethylene, mercury forms amalgam with palladium, platinum, copper, and aluminum and thus causes a hydrorefining catalyst to degrade. It is also known that the use of aluminum-based alloys as material for constructing an apparatus leads to decreased strength thereof due to amalgam corrosion.

Various methods for removing mercury contained in hydrocarbon oils have been studied and methods using various types of adsorbent have been proposed. Examples of methods for removing mercury with metal sulfides include a method using copper sulfide (Patent Literature 1) and a method using polysulfides of metals such as copper, nickel, iron, cobalt or the like (Patent Literature 2). There has been reported a method where liquid or gas containing mercury is brought into contact with an adsorbent containing a sulfide of one or more metal selected from the group consisting of molybdenum, tungsten and vanadium (Patent Literature 3). The methods described in these patent literatures provide high adsorptivity particularly to elemental mercury. However, in addition to elemental mercury, ionic mercury and organic mercury are contained in natural gas condensate and crude oil but cannot be removed with these above-described methods.

An example of a method for removing ionic mercury and organic mercury includes a method where organic mercury is decomposed in the presence of hydrogen using a catalyst and then removed with an adsorbent (Patent Literature 4). This method has, however, problems that a hydrogen plant is required under a circumstance with no hydrogen and some mercury is contained in hydrogen at the outlet of a reactor and discharged together therewith and thus mercury must be also removed from the discharged hydrogen. There is also a method where a liquid hydrocarbon oil containing hardly reactive mercury compounds (mercury dihalides such as mercury chloride, monoalkylmercury halides such as methylmercury chloride and dialkyl mercuries such as dimethyl mercury) is brought into contact with a metallic aluminum or a metallic zinc at a temperature of 200° C. or higher to decompose the hardly reactive mercury compounds and then the elemental mercury generated by the decomposition is removed by extraction using an extracting agent that is an aqueous solution containing an alkali polysulfide as a main component. This method does not need hydrogen for the decomposition and thus can overcome the above-described problems but cannot avoid the occurrence of considerable facility cost due to the need of an cracking unit and an extracting unit.

There is an alternative method wherein a hydrocarbon oil is brought into contact with an activated carbon or an activated carbon supporting a sulfurized alkali metal to remove mercury (Patent Literature 5). This method can remove mercury only with an adsorbing operation but the adsorbent described in this literature has a high adsorptivity to elemental mercury but is extremely weak in adsorptivity to ionic mercury and organic mercury and thus cannot treat a hydrocarbon oil containing ionic mercury and organic mercury constantly for a long period of time. Therefore, as described in Patent Literature 6, even when an activated carbon adsorbent is used, a hydrocarbon oil containing ionic mercury and organic mercury needs to be hydrotreated and then be brought into contact with an activated carbon adsorbent in order to treat such a hydrocarbon oil stably for a long period of time (Patent Literature 6).

In a technique to remove mercury from a hydrocarbon oil, it is more extremely difficult as described above to remove ionic mercury and organic mercury than to remove elemental mercury and thus a large facility cost has been required due to the necessity of an operation to decompose ionic mercury and organic mercury. Consequently, a method that can easily and efficiently remove ionic mercury and organic mercury has been demanded.

CITATION LIST

Patent Literature

Patent Literature 1: Japanese Patent Application Laid-Open Publication No. 52-76284
Patent Literature 2: U.S. Pat. No. 4,474,896
Patent Literature 3: Japanese Patent Application Laid-Open Publication No. 2-2873
Patent Literature 4: Japanese Patent Application Laid-Open Publication No. 1-231920
Patent Literature 5: Japanese Patent Application Laid-Open Publication No. 9-40971
Patent Literature 6: Japanese Patent Application Laid-Open Publication No. 10-251667

SUMMARY OF INVENTION

Technical Problem

Therefore, the present invention relates to removal of mercury in hydrocarbon oils and has an object to provide a method for adsorbing and removing ionic mercury and/or organic mercury from a hydrocarbon oil containing ionic mercury and/or organic mercury.

Solution to Problem

The inventors of the present invention have conducted extensive studies and research to achieve the object to provide a method for removing mercury in a hydrocarbon oil containing ionic mercury and/or organic mercury. As the result, the present invention has been accomplished on the basis of the finding that the use of some kind of silicate mineral as an adsorbent can remove selectively ionic mercury and/or organic mercury from a hydrocarbon oil containing ionic mercury and/or organic mercury only with an adsorbing operation efficiently for a long period of time.

That is, the present invention relates to a method for removing ionic mercury and/or organic mercury in a hydrocarbon oil by adsorption comprising bringing the hydrocarbon oil into contact with an adsorbent containing a layered silicate mineral having an interlayer charge of 0 or an interlayer charge of greater than 0 to 0.6 or less.

Furthermore, the present invention relates to a method for removing ionic mercury and/or organic mercury in hydrocarbon oil by adsorption comprising bringing the hydrocarbon oil into contact with an adsorbent containing a layered silicate mineral having an interlayer charge of 0 or an interlayer charge of greater than 0 to 0.6 or less and an adsorbent containing an activated carbon and/or a metal sulfide.

Advantageous Effect of Invention

The present invention can efficiently and stably remove the ionic mercury and/or organic mercury in a hydrocarbon oil containing the same for a long period of time by bringing the hydrocarbon oil into contact with a specific silicate mineral.

BRIEF DESCRIPTION OF DRAWINGS

FIG. 1 is a view showing the structure of a layered silicate mineral

FIG. 2 is a view showing the balance of charges in a layered silicate mineral (2:1 layer structure)

DESCRIPTION OF EMBODIMENTS

Hereinafter, the present invention will be described in more detail.

No particular limitation is imposed on the hydrocarbon oil to be treated by the present invention if it is an ionic mercury and/or organic mercury-containing hydrocarbon oil which is liquid in normal conditions. Examples of the hydrocarbon oil include liquid hydrocarbons derived from natural gas or petroleum associated gas and hydrocarbon oils such as hydrocarbons with 5 carbon atoms and fractions with a boiling point of 180° C. or lower resulting from fractional distillation of natural gas or petroleum associated gas or crude oil in an atmospheric distillation unit. The removal method of the present invention can be applied to even natural gas and hydrocarbons such as ethylene and propylene, which are gaseous at ambient temperatures and pressures, in a liquefied state if they can be liquefied by applying thereto pressure.

The mercury in such hydrocarbon oils is contained as elemental mercury, ionic mercury compounds, organic mercury compounds and may be contained in an amount of usually a few ppb by weight to 500 ppb by weight depending on the type of hydrocarbon oil. The method of the present invention can efficiently adsorb and remove ionic mercury and/or organic mercury for a long period of time.

In the present invention, elemental mercury refers to mercury element and is the only metallic element that does not coagulate at ordinary temperatures and pressures. In the present invention, the ionic mercury refers to mercury that dissociates in the form of mercury ion ($Hg_2^{2+}$, $Hg^{2+}$) in water, and mercurous chloride ($Hg_2Cl_2$) and mercuric chloride ($HgCl_2$) are well-known.

In the present invention, the organic mercury refers to a mercury compound wherein an alkyl group and mercury bonds, and dimethyl mercury, diethyl mercury and the like exist. On the basis of Water Quality Pollution Control Act or environmental criterion, monoalkylmercury halides such as methylmercury chloride, methylmercury bromide and the like are dissolved in water and dissociated as monovalent ions but are treated as organic mercury in the present invention.

In the present invention, the layered silicate mineral refers to a silicate mineral which comprises a tetrahedral structure wherein silicon, aluminum or magnesium is centrally located and oxygens surround therearound to form a tetrahedron and an octahedral structure wherein aluminum, magnesium or iron is centrally located and oxygens surround therearound to form an octahedron as a basic structure and may be of a 1:1 layer structure formed by one tetrahedron and one octahedron or a 2:1 layer structure formed by two tetrahedrons and one octahedron. The both structures are laminates of tetrahedron sheets and octahedron sheets each forming a two dimensional layer (see FIG. 1).

With regard to the interlayer charge in a layered silicate mineral, each silicate layer is repeated as indicated by (basal oxygen)$^-$-(Si)$^+$-(apex oxygen)$^-$-(octahedral cations)$^+$-(apex oxygen)$^-$-(Si)$^+$-(basal oxygen)$^-$, and for the 2:1 structure, when the atom located centrally in the tetrahedral structure is $Si^{4+}$ and the atom located centrally in the octahedral structure is $Al^{3+}$, the sum of charge in the 2:1 structure is 0. In this case, the charge in the structure is deemed balanced and thus no charge is generated between the layers. However, in the tetrahedral structure, $Si^{4+}$ undergoes isomorphous replacement with $Al^{3+}$ while in the octahedral structure, $Al^{3+}$ undergoes isomorphous replacement with $Mg^{2+}$ or $Fe^{2+}$, and thus the charge balance is destroyed. As the result, since the charge of cation is decreased, the whole 2:1 structure becomes negatively charged, and this negative charge generates as the interlayer charge. In the actual minerals, the charge is balanced by capturing cations in an amount matching the layer charge between the layers (see FIG. 2).

The interlayer charge indicating 0 means that the charge in a unit structure is balanced as described above. For the 1:1 structure, the charge is balanced in all the layers and thus the interlayer charge is 0. Typical examples of such silicate minerals include lizardite, amesite and chrysotile belonging to the serpentine group and kaolinite, dickite and halloysite belonging to the kaolin group. Talc and pyrophyllite exist as silicate minerals with a 2:1 structure.

The interlayer charge of greater than 0 and 0.6 or less means that 0.6 or fewer $Si^{4+}$ in the tetrahedron and 0.6 or fewer $Al^{+3}$ in the octahedron in the structure are replaced with $Al^{3+}$ and $Mg^{2+}$ or $Fe^{2+}$, respectively. Typical examples of such minerals include those belonging to the smectite group such as smectite, saponite, hectorite, montmorillonite and beidellite.

The interlayer charge of greater than 0.6 means that more than 0.6 $Si^{4+}$ in the tetrahedron and more than 0.6 $Al^{+3}$ in the octahedron in the structure are replaced with $Al^{3+}$ and $Mg^{2+}$ or $Fe^{2+}$, respectively. Typical examples of such minerals include those having an interlayer charge of 0.6 to 1.0 belonging to the isinglass (also referred to as "mica") group such as phlogopite, biotite, muscovite, paragonite and illite and those having an interlayer charge of 1.8 to 2.0 belonging to the brittle mica group such as clintonite and margarite.

In the present invention, the use of an adsorbent containing a layered silicate mineral having an interlayer charge of 0 or an interlayer charge of greater than 0 and 0.6 or less can stably and efficiently remove from a hydrocarbon oil containing ionic mercury and/or organic mercury the ionic mercury and organic mercury for a long period of time.

The necessary amount of the adsorbent can be arbitrarily determined depending on the intended outlet mercury concentration and the type of adsorbent to be used, but when the mercury concentration in a hydrocarbon oil is 100 µg/kg, 1 kg of the adsorbent can remove 0.1 to 10 g of organic mercury and ionic mercury.

In the present invention, the above-described layered silicate mineral may be used in the original powdery form but may be used after being shaped into a pelletized, crushed or particulate form. More specifically, the layered silicate mineral or powder containing the layered silicate mineral as they are or as mixture with a binder such as alumina or silica may be used after being shaped by tablet compression, tumbling granulation or extrusion molding.

Furthermore, in the present invention, any product containing the above-described layered silicate mineral can be used. More specifically, naturally-produced white clay and some activated earth produced by acid-treating white clay may also be used.

Although various method may be applied to bring a hydrocarbon oil into contact with the adsorbent, a fixed bed mode is suitably used because an adsorbing treating apparatus is simple in structure and is easily operable. The fixed bed mode is a mode where an adsorbing treatment is carried out by supplying continuously a hydrocarbon oil into a packed bed configured by filling and fixing the adsorbent in a cylindrical structure.

In the present invention, the above-described adsorbent containing a layered silicate mineral having an interlayer charge of 0 or an interlayer charge of greater than 0 and 0.6 or less in combination with an adsorbent capable of removing elemental mercury can remove not only ionic mercury and/or organic mercury but also elemental mercury from a hydrocarbon oil.

The adsorbent capable of removing elemental mercury may be a conventional adsorbent, such as activated carbon (activated carbon having been subjected to a treatment suitable for adsorbing mercury), metal sulfides (those supporting a sulfurized metal on alumina).

This adsorbent capable of removing elemental mercury may be disposed the prior stage and/or subsequent stage where the adsorbent containing the layered silicate mineral of the present invention or may be used as a mixture therewith.

The method of the present invention can remove mercury down to a trace concentration or extremely low concentration for a hydrocarbon oil containing mercury in a large amount or a minute amount.

The above description illustrates merely an example of the embodiments of the present invention and thus can be modified in accordance with the description of claims.

EXAMPLES

Hereinafter, the present invention will be described in more detail by way of the following examples, which should not be construed as limiting the scope of the invention.

In the examples and comparative examples, the mercury content was measured using a general purpose full automatic mercury analyzer "Mercury/SP-3D" manufactured by Nippon Instruments Corporation, the mercury compounds were analyzed by type in accordance with the method described in ITAS ((International Trace Analysis Symposium '90 (Jul. 23-27, 1990) conference minutes 3P-40 (Akio FURUTA, et al.)).

The hydrocarbon oils containing mercury used in the examples and comparative examples were prepared in the following manners.

(Preparation of Hydrocarbon Oil Containing Elemental Mercury)

Into a 100 ml screw cap bottle with a stirrer therein was put one grain of elemental mercury, followed by addition of normal hexane having been subjected to bubbling with 100 ml argon gas. The gaseous phase portion was then substituted with argon gas, and the mouth of the bottle was covered with a polytetrafluoroethylene sheet and capped. Thereafter, stirring was carried out with a magnetic stirrer for five days. The mercury concentration in the hexane at that time was from 500 to 1500 µg/L. This hexane solution was diluted with hexane in the amount of 5 times more of the solution and used as an elemental mercury-containing hydrocarbon oil in the examples and comparative example. The mercury concentration in the hexane solution after being diluted was 140 µg/L.

(Preparation of Hydrocarbon Oil Containing Organic Mercury and Ionic Mercury)

Pagerungan condensate (mercury content: 66 µg/L) imported from East Timor was filtered with a 10 µm membrane filter, referring to the method described in ITAS (International Trace Analysis Symposium '90 (Jul. 23-27, 1990) conference minutes 3P-40 (Akio FURUTA, et al.)) and then stripped with helium gas to remove elemental mercury thereby preparing a hydrocarbon oil containing organic mercury and ionic mercury. Specifically, 1000 ml of Pagerungan condensate were filtered with a 10 µm membrane filter and then bubbled, injecting helium gas at 100 ml/min in a two-necked flask equipped with a coiled condenser at a temperature of 40° C. for 1.5 hour. After this treatment, the mercury concentration in the hydrocarbon oil was 45 µg/L (organic mercury: 33 µg/L, ionic mercury: 12 µg/L).

Example 1

The hydrocarbon oil containing organic mercury and ionic mercury thus prepared in an amount of 50 ml was put into a 50 ml screw cap bottle containing therein a stirrer, and 0.005 g pulverized kaolinite that is a layered silicate mineral was added thereto. The mixture was allowed to stand, stirring for 140 hours. After 140 hours, the hydrocarbon oil was taken out to measure the content of organic mercury and ionic mercury contained therein.

The same procedures were carried out for the hydrocarbon oil containing elemental mercury thus prepared.

Example 2

The same procedures as Example 1 were followed except for changing the layered silicate mineral to talc.

Example 3

The same procedures as Example 1 were followed except for changing the layered silicate mineral to smectite.

Example 4

The same procedures as Example 1 were followed except for changing the layered silicate mineral to montmorillonite.

Comparative Example 1

The same procedures as Example 1 were followed except for changing the layered silicate mineral to isinglass.

Comparative Example 2

The same procedures as Example 1 were followed except for changing the layered silicate mineral to illite.

Comparative Example 3

The same procedures as Example 1 were followed except for using 0.05 g of a commercially available coconut husk active carbon instead of 0.005 g of the layered silicate mineral.

Comparative Example 4

The same procedures as Example 1 were followed except for using 0.05 g of a copper sulfide+alumina-based adsorbent instead of 0.005 g of the layered silicate mineral.

Evaluation

Table 1 sets forth the adsorption capacity in respect of organic mercury and ionic mercury in Examples 1 to 4 and Comparative Examples 1 to 4. The adsorption capacity for organic mercury and ionic mercury exceeds 350 μg/g when using the layered silicate minerals having no interlayer charge or an interlayer charge of greater than 0 and 0.6 or less of Examples 1 to 4 while the adsorption capacity was 20 μg/g or less, which is extremely small when using the layered silicate mineral having an interlayer charge of greater than 0.6 of Comparative Examples 1 and 2. Similarly to Comparative Examples 1 and 2, the adsorption capacity for organic mercury and ionic mercury was also small in Comparative Examples 3 and 4 using conventional commercially available coconut husk active carbon and metal sulfide (copper sulfide+alumina) having been used for removal of mercury.

TABLE 1

| | Example 1 | Example 2 | Example 3 | Example 4 | Comparative Example 1 | Comparative Example 2 | Comparative Example 3 | Comparative Example 4 |
|---|---|---|---|---|---|---|---|---|
| Adsorbing material | kaolinite | talc | smectite | montmorillonite | mica | illite | coconut husk active carbon (commercially available) | copper sulfide + alumina |
| Layer structure | 1:1 layer structure | 2:1 layer structure | 2:1 layer structure | 2:1 layer structure | 2:1 layer structure | 2:1 layer structure | | |
| Interlayer charge | none (charge = 0) | none (charge = 0) | 0.2 to 0.6 | 0.2 to 0.6 | 0.6 to 1.0 | 0.6 to 1.0 | | |
| Elemental mercury concentration in hydrocarbon oil (μg/L) (before adsorption) | 140 | 140 | 140 | 140 | 140 | 140 | 140 | 140 |
| Elemental mercury concentration in hydrocarbon oil (μg/L) (after adsorption) | — | 109 | — | 101 | — | — | 0.4 | 0.5 |
| Adsorbed elemental mercury amount (μg/L) | — | 31 | — | 39 | — | — | 140 | 140 |
| Ionic mercury + organic mercury concentration (μg/L) in hydrocarbon oil (before adsorption) | 45 | 45 | 45 | 45 | 45 | 45 | 45 | 45 |
| Ionic mercury + organic mercury concentration (μg/L) in hydrocarbon oil (after adsorption) | 2 | 3.3 | 5.3 | 8.2 | 43 | 44.6 | 10 | 8 |
| Adsorption capacity for ionic mercury and organic mercury (mercury-μg/adsorbent-g) | 430 | 417 | 397 | 368 | 20 | 4 | 35 | 37 |

INDUSTRIAL APPLICABILITY

The method of the present invention is extremely useful for industrial purposes because it adsorbs and removes ionic mercury and/or organic mercury contained in a hydrocarbon oil efficiently for a long period of time.

The invention claimed is:

1. A method for adsorbing and removing ionic mercury and/or organic mercury in a hydrocarbon oil, comprising bringing the hydrocarbon oil into contact with an adsorbent comprising a layered silicate mineral having an interlayer charge of 0 or an interlayer charge of greater than 0 to 0.6 or less and an optional binder, wherein the adsorbent contains substantially no copper, and wherein the adsorbing is performed by the adsorption action of only the layered silicate mineral.

2. The method according to claim 1, wherein said layered silicate mineral having an interlayer charge of 0 is lizardite, amesite, chrysotile, kaolinite, dickite, halloysite, talc or pyrophyllite.

3. The method according to claim 1, wherein said layered silicate mineral having an interlayer charge of greater than 0 to 0.6 or less is smectite, saponite, hectorite, montmorillonite or beidellite.

4. The method according to claim 1, wherein the method is performed in the absence of hydrogen.

5. A method for adsorbing and removing ionic mercury and/or organic mercury in hydrocarbon oil, comprising bringing the hydrocarbon oil into contact with an adsorbent comprising a layered silicate mineral having an interlayer charge of 0 or an interlayer charge of greater than 0 to 0.6 or less and an optional binder, and an adsorbent containing an activated carbon and/or a metal sulfide, wherein the adsorbent comprising the layered silicate mineral contains substantially no copper, and wherein the adsorbing is performed by the adsorption action of only the layered silicate mineral.

6. The method according to claim 5, wherein said layered silicate mineral having an interlayer charge of 0 is lizardite, amesite, chrysotile, kaolinite, dickite, halloysite, talc or pyrophyllite.

7. The method according to claim 5, wherein said layered silicate mineral having an interlayer charge of greater than 0 to 0.6 or less is smectite, saponite, hectorite, montmorillonite or beidellite.

8. The method according to claim 5, wherein the method is performed in the absence of hydrogen.

* * * * *